(12) United States Patent
Wongpaisarnsin et al.

(10) Patent No.: US 10,547,845 B2
(45) Date of Patent: *Jan. 28, 2020

(54) INFORMATION PROCESSING DEVICE AND INFORMATION PROCESSING METHOD

(71) Applicant: SONY CORPORATION, Tokyo (JP)

(72) Inventors: Goragot Wongpaisarnsin, Bangkok (TH); Tetsuo Yutani, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/358,704

(22) Filed: Mar. 20, 2019

(65) Prior Publication Data

US 2019/0222847 A1 Jul. 18, 2019

Related U.S. Application Data

(63) Continuation of application No. 15/514,730, filed as application No. PCT/JP2015/069680 on Jul. 8, 2015.

(30) Foreign Application Priority Data

Oct. 3, 2014 (JP) .................................. 2014-204680

(51) Int. Cl.
G06K 9/00 (2006.01)
H04N 19/136 (2014.01)
(Continued)

(52) U.S. Cl.
CPC .............. *H04N 19/136* (2014.11); *G06K 9/03* (2013.01); *G06K 9/46* (2013.01); *G06K 9/6201* (2013.01);
(Continued)

(58) Field of Classification Search
CPC .... H04N 19/103; H04N 19/12; H04N 19/149; G06K 9/03; G06K 9/46; G06K 9/6201
(Continued)

(56) References Cited

U.S. PATENT DOCUMENTS

| | | | |
|---|---|---|---|
| 2008/0260042 A1* | 10/2008 | Shah | H04N 19/197 375/240.25 |
| 2012/0275511 A1* | 11/2012 | Shemer | H04N 19/139 375/240.02 |

(Continued)

FOREIGN PATENT DOCUMENTS

| | | |
|---|---|---|
| JP | 5-41859 A | 2/1993 |
| JP | 11-154872 A | 6/1999 |

(Continued)

OTHER PUBLICATIONS

International Search Report dated Sep. 15, 2015 in PCT/JP2015/069680 filed Jul. 8, 2015.

*Primary Examiner* — Van D Huynh
(74) *Attorney, Agent, or Firm* — Xsensus LLP

(57) ABSTRACT

A purpose of the present invention is to easily select an appropriate processing format, an appropriate parameter, or the like by predicting a process result that varies according to content of data before executing the process.

According to the present invention, provided is an information processing device including: a feature amount extraction unit configured to extract a feature amount of data serving as a target of a process; a feature amount matching unit configured to match the feature amount with one or more reference feature amounts associated with a prediction result of the process in a database; and a result prediction unit configured to predict a result obtained in a case where the process is executed for the data, on the basis of a result of the matching.

21 Claims, 10 Drawing Sheets

(51) Int. Cl.
*H04N 19/154* (2014.01)
*G06K 9/62* (2006.01)
*G06K 9/46* (2006.01)
*G06K 9/03* (2006.01)
*H04N 19/179* (2014.01)
*H04N 19/12* (2014.01)
*H04N 19/103* (2014.01)
*H04N 19/149* (2014.01)

(52) U.S. Cl.
CPC ........... *H04N 19/103* (2014.11); *H04N 19/12* (2014.11); *H04N 19/149* (2014.11); *H04N 19/154* (2014.11); *H04N 19/179* (2014.11)

(58) Field of Classification Search
USPC ......................................................... 382/190
See application file for complete search history.

(56) References Cited

U.S. PATENT DOCUMENTS

| | | | |
|---|---|---|---|
| 2013/0163661 A1* | 6/2013 | Zhang | H04N 19/00133 375/240.02 |
| 2015/0161476 A1* | 6/2015 | Kurz | G06K 9/4671 382/190 |
| 2017/0154056 A1* | 6/2017 | Qiu | G06F 16/5838 |

FOREIGN PATENT DOCUMENTS

| | | |
|---|---|---|
| JP | 2004-266640 A | 9/2004 |
| JP | 2011-182243 A | 9/2011 |
| JP | 2012-114528 A | 6/2012 |
| WO | 2008/133677 A1 | 11/2008 |
| WO | 2012/033964 A1 | 3/2012 |
| WO | 2012/149296 A2 | 11/2012 |

* cited by examiner

FIG. 7
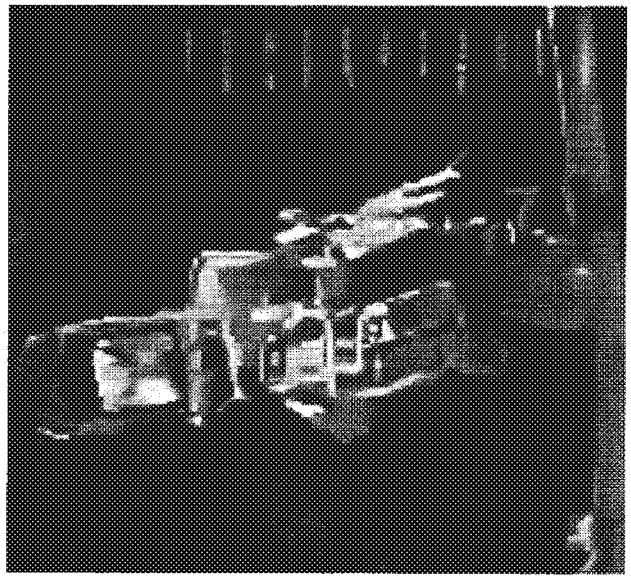
SAMPLE 1, PARAMETER = 0
(B)
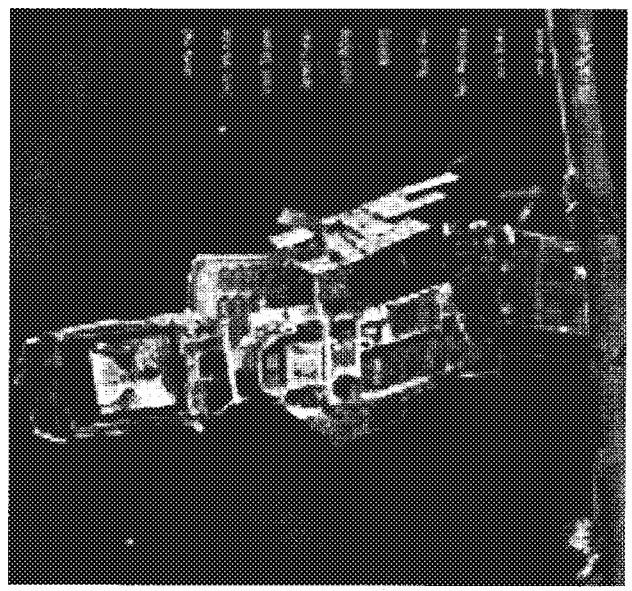
SAMPLE 1, PARAMETER = 80
(A)

FIG. 8
SAMPLE 2, PARAMETER = 80
(A)
SAMPLE 2, PARAMETER = 0
(B)

INFORMATION PROCESSING DEVICE AND INFORMATION PROCESSING METHOD

CROSS-REFERENCE TO RELATED APPLICATIONS

This application is a continuation of U.S. patent application Ser. No. 15/514,730, filed Mar. 27, 2017, which is based on PCT filing PCT/JP2015/069680, filed Jul. 8, 2015, and claims priority to JP 2014-204680, filed Oct. 3, 2014, the entire contents of each of which are incorporated herein by reference.

TECHNICAL FIELD

The present disclosure relates to information processing devices and information processing methods.

BACKGROUND ART

In recent years, since network technologies have been progressed and performance of terminal devices has been improved, data such as images and sound is often transmitted and received via networks. However, transmission rates of the networks and processing capability of the terminal devices are limited. Therefore, the data is often compressed to an appropriate size and then transmitted or received. For example, Patent Literature 1 describes a technology for preparing compressed data for respective reception devices so as to transmit data with higher quality in a range in which a transmission rate for transmitting the data to the respective reception devices does not exceed a standard transmission rate on the basis of a comparison result between a threshold and the number of the reception devices to which the data is transmitted.

CITATION LIST

Patent Literature

Patent Literature 1: JP 2011-182243A

DISCLOSURE OF INVENTION

Technical Problem

In the case where data such as an image or sound is compressed, sometimes compression effect varies significantly according to content of the data even when the same compression format and the same parameter setting are used. The compression effect includes a compression rate, quality of the data after compression (noise percentage or the like of image or sound), identity between the data before compression and the data after compression, and processing load for compression and decompression, for example. Therefore, selection of a compression format and a parameter appropriate for content of data is important for effective compression.

However, in many cases, the compression effect cannot be known until data is actually compressed. Therefore, in actuality, data compressed by using various compression formats or parameters is prepared and stored in advance, or a compression process is executed by using a compression format or a parameter that are not always appropriate, for example. In this case, massive storage capacity is occupied by preliminarily compressed data, or it is difficult to appropriately process data requiring real-time provision. Such a case may occur in the case of another process whose effect varies according to content of data, such as encryption.

Accordingly, the present disclosure proposes a novel and improved information processing device and information processing method that are capable of easily selecting an appropriate processing format, an appropriate parameter, or the like by predicting a process result that varies according to content of data before executing the process.

Solution to Problem

According to the present disclosure, there is provided an information processing device including: a feature amount extraction unit configured to extract a feature amount of data serving as a target of a process; a feature amount matching unit configured to match the feature amount with one or more reference feature amounts associated with a prediction result of the process in a database; and a result prediction unit configured to predict a result obtained in a case where the process is executed for the data, on the basis of a result of the matching.

In addition, according to the present disclosure, there is provided an information processing method including: extracting a feature amount of data serving as a target of a process; matching, by a processor, the feature amount with one or more reference feature amounts associated with a prediction result of the process in a database; and predicting a result obtained in a case where the process is executed for the data, on the basis of a result of the matching.

Advantageous Effects of Invention

As described above, according to the present disclosure, it is possible to easily select an appropriate processing format, an appropriate parameter, or the like by predicting a process result that varies according to content of data before executing the process.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a diagram illustrating an example of image data processing results.

FIG. 8 is a diagram illustrating an example of image data processing results.

MODE(S) FOR CARRYING OUT THE INVENTION

Figure 1:
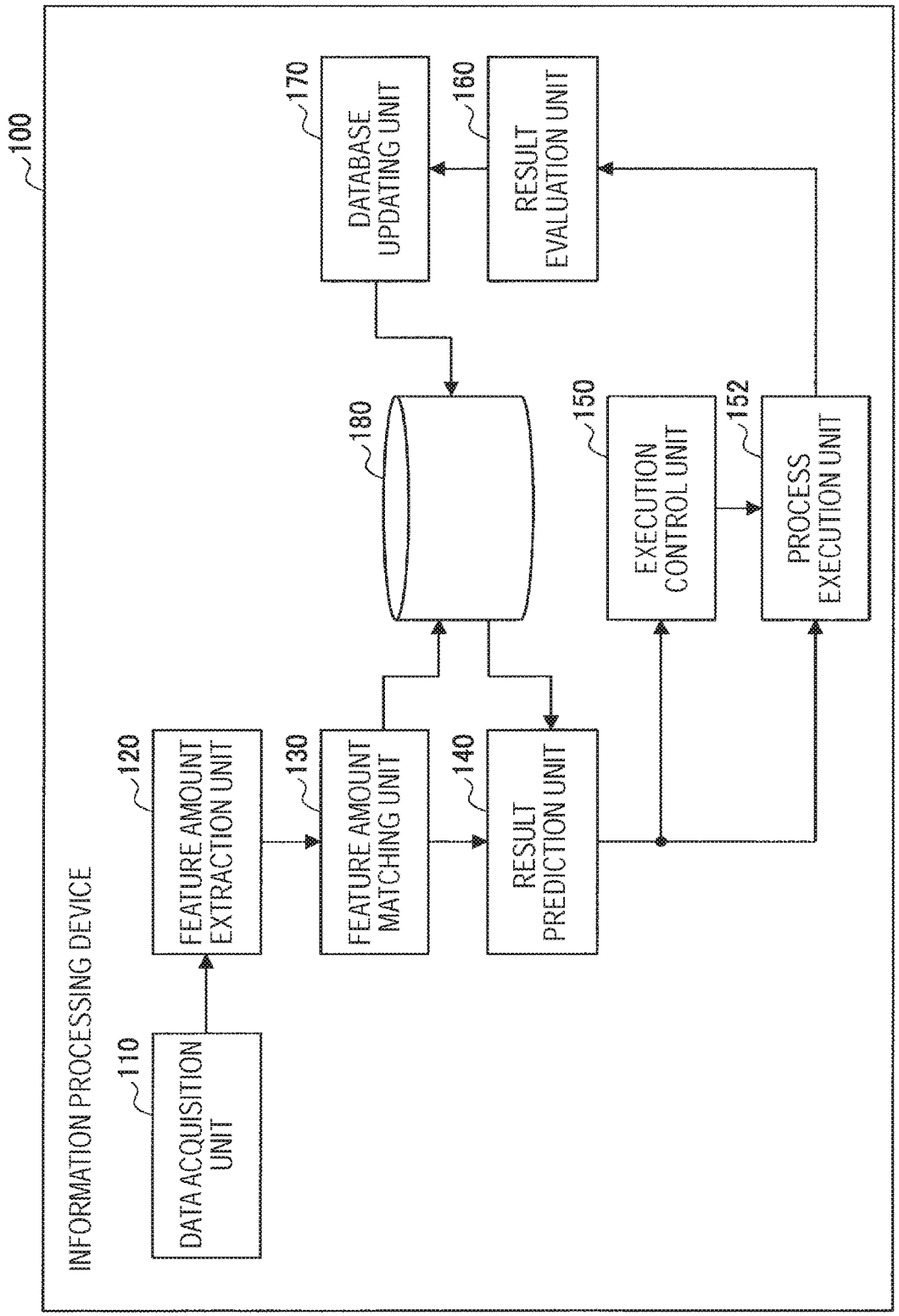
FIG. 1 is a block diagram schematically illustrating a functional configuration of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. System configuration
2. Workflow of process
3. Specific example of image data
4. Example of image data processing result
5. Hardware configuration
6. Supplement (1. System Configuration)

FIG. 1 is a block diagram schematically illustrating a functional configuration of an information processing device according to an embodiment of the present disclosure. With reference to FIG. 1, an information processing device 100 includes a data acquisition unit 110, a feature amount extraction unit 120, a feature amount matching unit 130, a result prediction unit 140, an execution control unit 150, a result evaluation unit 160, and a database updating unit 170. Such structural elements are implemented by a processor operating according to a program, such as a central processing unit (CPU) in the information processing device 100. In addition, the information processing device 100 includes a database 180. The database 180 is implemented by memory or a storage device in the information processing device 100 for example. The example of the hardware configuration of the information processing device 100 will be described later.

Specifically, the information processing device 100 may be various devices that execute a process of data. For example, the information processing device 100 constitutes a server that delivers data such as images and sound to a terminal device of a client. In this case, the server may be constituted by one or more information processing devices. Therefore, a function of the information processing device 100 in the illustrated example may be implemented in a manner that the function is distributed to the plurality of information processing devices that constitute the server. As the functional configuration of the server for delivering data to the client, various well-known configurations can be used. Therefore, detailed description is omitted here.

The information processing device 100 may be the terminal device of the client. For example, a data compression process is performed in the terminal device in the case of uploading an image captured by a camera of the terminal device to the server, or transmitting the image to another terminal device. In general, the terminal device has limited resource compared to the server. Therefore, it is useful to effectively perform a data process such as compression. In this case, for example, the database 180 does not have to be disposed in the terminal device. In other words, it may be possible that the information processing device 100 implemented as the terminal device does not include the database 180 and refers to the database 180 built on an external device such as the server. As the functional configuration of the terminal device for creating, processing, or transmitting data, various well-known configurations can also be used. Therefore, detailed description is omitted here.

The data acquisition unit 110 acquires data serving as a target of a process. For example, the data may include various kinds of data such as still image data, moving image data, sound data, and text data. For example, the data acquisition unit 110 acquires data received from an external device via a communication device included in the information processing device 100. The data acquisition unit 110 may acquire data created in the information processing device 100 such as text data input via an input device, captured image data created by an imaging device, or sensing data created by a sensor.

The feature amount extraction unit 120 extracts a feature amount of the data acquired by the data acquisition unit 110. The feature amount may be any kind of feature amount that can be compared with another feature amount as described later. Technologies for extracting feature amounts from various kinds of data (image, sound, text, and the like) have already been known. Therefore, the feature amount extraction unit 120 can use such technologies appropriately. For example, the feature amount may be represented as a vector in a feature space. More specifically, for example, a color histogram of an image, arrangement of feature points, or a bit pattern of data may be extracted as the feature amount. It is desirable that the feature amount extracted from an image is independent of resolution and rotation of the image. In addition, as described later, it is desirable that the extracted feature amount has high robustness because the extracted feature amount is compared with a reference feature amount stored in the database 180. For example, it is possible to increase robustness of extracted feature amounts as a whole by combining a plurality of types of feature amounts.

The feature amount matching unit 130 matches the feature amount extracted by the feature amount extraction unit 120 with one or more reference feature amounts associated with a prediction result of the process in the database 180. The reference feature amount is a predetermined feature amount which can be compared with the extracted feature amount. The reference feature amount may be a vector of the same dimension as the extracted feature amount, for example. For example, the feature amount matching unit 130 executes the matching on the basis of calculated distance between the extracted feature amount and the reference feature amount in the feature space. In this case, for example, matching succeeds when the distance between the extracted feature amount and the reference feature amount is less than a threshold. In the case where a plurality of reference feature amounts are defined in the database 180, the feature amount matching unit 130 matches the extracted feature amount with each of the reference feature amounts. In this case, it is acceptable that matching between the extracted feature amount and the plurality of reference feature amounts succeeds.

The result prediction unit 140 predicts a result obtained in the case where the process is executed for the data, on the basis of a result of the matching executed by the feature amount matching unit 130. The prediction result may include effect obtained from the process and/or cost of the process. More specifically, in the case where a data compression process is executed for example, the prediction result may include a compression rate, quality of the data after compression, identity between the data before compression and the data after compression, and the like. In the case where a data encryption process is executed for example, the prediction result may include cipher strength and the like. Regardless of the types of the processes, the prediction result may include process time, an amount of resource consumption, or the like. The result prediction unit 140 refers to the database 180 for the reference feature amount of which matching with the extracted feature amount has succeeded, and reads out a prediction result of a process associated with the reference feature amount.

The execution control unit 150 controls execution of the process on the data on the basis of the result predicted by the result prediction unit 140. The process execution unit 152 executes the process on the data under the control of the execution control unit 150. As described above, the process to be executed may be a process whose effect varies according to content of the data, such as compression or encryption. For example, the execution control unit 150 decides a setting of the process in the process execution unit 152 on the basis of the prediction result. The setting of the process may include a process format and/or a process parameter. For example, the execution control unit 150 may decide whether or not the process execution unit 152 executes the process on the basis of the prediction result. The data processed by the process execution unit 152 (or the data that has skipped the process) may be transmitted to an external device via the communication device included in the information processing device 100, for example. Alternatively, the processed data may be temporarily or permanently stored in the memory or the storage of the information processing device 100.

According to the embodiment, the reference feature amounts are associated with prediction results of processes on data in the database 180. As described above, for example, in the case where the process execution unit 152 executes the data compression process, a prediction result may include a compression rate (reduction ratio in data size between data before compression and data after compression), quality of the data after compression (noise percentage or the like of image or sound), and identity between the data before compression and the data after compression (for example, how much image or sound before compression is similar to image or sound after compression especially in view of visible or audible features). In the case where the process execution unit 152 executes a data encryption process for example, a prediction result may include the cipher strength and the like. A prediction result that is common in any type of process may include process time, an amount of resource consumption, or the like. The amount of resource consumption may include amount of power consumption, or a use rate (usage amount) of a processor or memory.

For example, in the case where the reference feature amount is associated with a plurality of prediction results for respective process formats and/or for respective process parameters in the database 180, the result prediction unit 140 can predict a result for each of the process formats and/or for each of the process parameters. In this case, the execution control unit 150 can decide a more effective setting of each of the processes (such as process format and/or process parameter). In the case where the reference feature amount is associated with a single prediction result in the database 180, the execution control unit 150 can decide whether or not to execute the process. For example, in the case where effect (such as compression rate or cipher strength) obtained from the process is disproportionate to cost (such as process time or amount of resource consumption) of the process, the execution control unit 150 decides not to execute the process, and the data skips the process in the process execution unit 152. Also in the case where the reference feature amount is associated with a plurality of prediction results and effects in any of the results are disproportionate to cost, it may be possible the execution control unit 150 decides not to execute the process.

To enable such prediction and decision, information on prediction results stored in the database in association with the reference feature amounts may be quantitative information on a compression rate, cipher strength, process time, or the like, for example. Alternatively, the information on prediction results may be qualitative information. For example, with regard to a combination of a process format and/or a process parameter and a certain reference feature amount, information indicating that "a process using the process format and/or the process parameter is not suitable for data having a feature amount corresponding to the certain reference feature amount" may be stored.

The result evaluation unit 160 evaluates a result of the process executed by the process execution unit 152. The database updating unit 170 updates the database 180 on the basis of a data processing result evaluated by the result evaluation unit 160, and the feature amount of the data extracted in advance by the feature amount extraction unit 120. More specifically, for example, in the case where the matching between the feature amount of the data and the reference feature amount in the feature amount matching unit 130 has succeeded, the database updating unit 170 updates information on the prediction result of the process associated with the reference feature amount on the basis of relation between the feature amount of the data and the reference feature amount (such as distance in feature space) as necessary. On the other hand, for example, in the case where the matching between the feature amount of the data and the reference feature amount in the feature amount matching unit 130 has been failed, the database updating unit 170 adds the feature amount of the data as a new reference feature amount in the database 180 in association with information on the result of the process evaluated by the result evaluation unit 160.

The result of the process evaluated by the result evaluation unit 160 corresponds to information on the prediction result of the process associated with the reference feature amount in the database 180. In other words, the result of the process evaluated by the result evaluation unit 160 may include a compression rate in the data compression process, quality of the data after compression, and identity between the data before compression and the data after compression, for example. In addition, the result of the process may include cipher strength in the data encryption process. In addition, the result of the process may include process time or an amount of resource consumption.

For example, the database 180 may be created by machine learning in which data created on the basis of the result of the process executed regardless of the feature amount of the data is used as training data. More specifically, for example, the feature amount extraction unit 120 extracts feature amounts of a certain number of pieces of data in the information processing device 100, and then the process execution unit 152 executes the process, and the result evaluation unit 160 evaluates effect of the process. The database updating unit 170 (in this case, also referred to as database creation unit) extracts tendency of effect of the process for each feature amount from combinations of feature amounts of the data and effects of the processes obtained in the above described steps. Thereby, it is possible to identify a reference feature amount and effect of a process corresponding to the reference feature amount. As described above, the database updating unit 170 may update information that associates the reference feature amounts and the prediction results of the processes and that is stored in the database 180.

(2. Workflow of Process)

Figure 2:
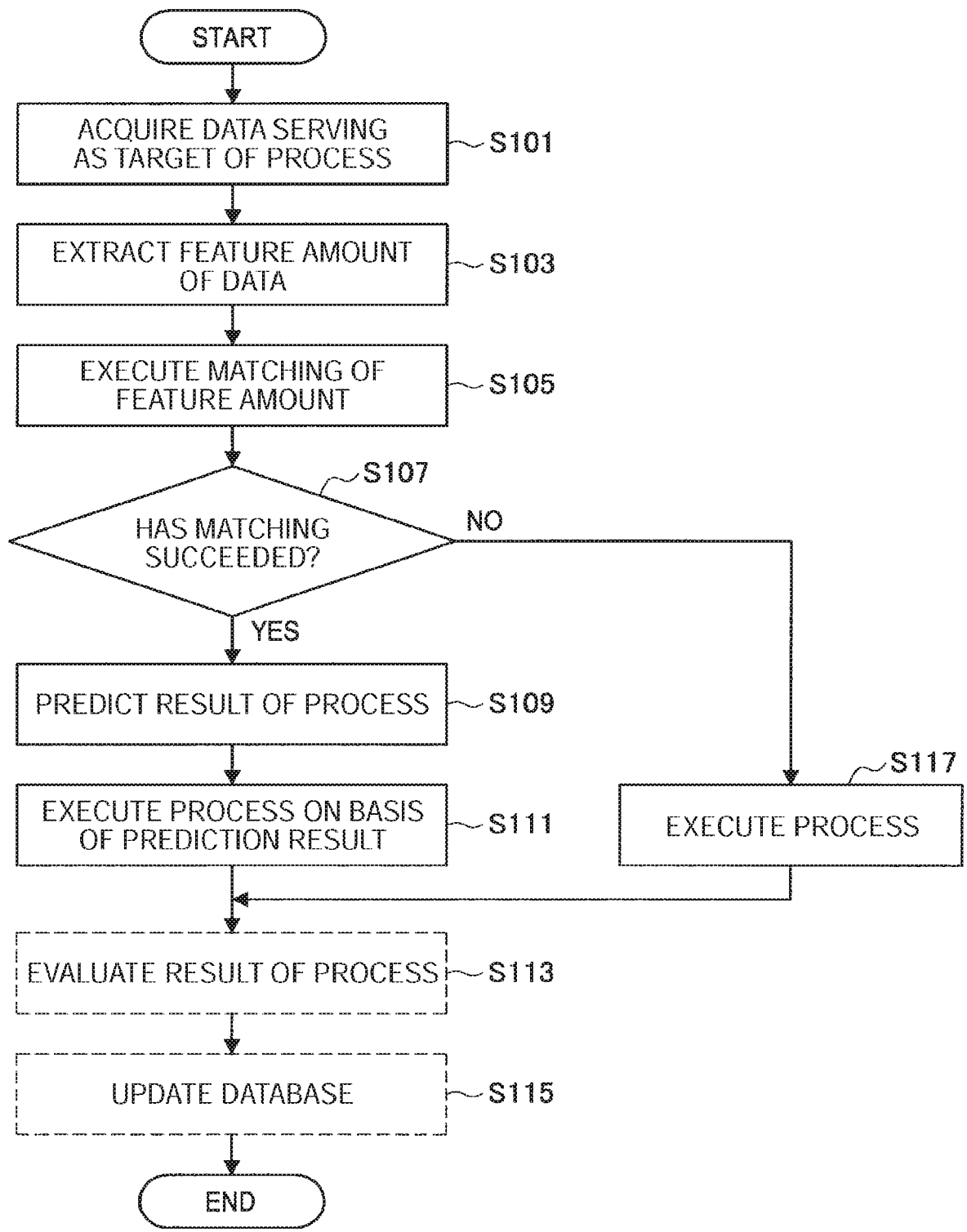
FIG. 2 is a flowchart illustrating an example of a process in the case of referring to an already constructed database according to an embodiment of the present disclosure.

FIG. 2 is a flowchart illustrating an example of a process in the case of referring to an already constructed database according to the embodiment of the present disclosure.

With reference to FIG. 2, the data acquisition unit 110 first acquires data serving as a target of a process (S101). As described above, the data acquisition unit 110 may acquire data received from the external device via the communication device included in the information processing device 100, or may internally acquire data created by the input device, the imaging device, or the sensor that are included in the information processing device 110. Next, the feature amount extraction unit 120 extracts a feature amount of the acquired data (S103). For example, the feature amount extraction unit 120 may extract feature amounts different according to types of data.

Next, the feature amount matching unit 130 matches the extracted feature amount with reference feature amounts associated with prediction results of a process in the database 180 (S105). The feature amount matching unit 130 provides information on a result of the matching to the result prediction unit 140. This information indicates whether or not the extracted feature amount corresponds to any of the reference feature amounts stored in the database 180. The result prediction unit 140 predicts effect of execution of the process on the data on the basis of the provided information.

More specifically, the result prediction unit 140 determines whether or not the matching has succeeded, that is, whether or not the database 180 includes a reference feature amount corresponding to the feature amount of the data serving as the target of the process (S107). In the case where the matching has succeeded (YES), the result prediction unit 140 reads out information associated with the reference feature amount in the database 180, and predicts a result of execution of the process on the data serving as the target of the process on the basis of this information (S109).

In this case, subsequently, the process execution unit 152 executes the process on the data under the control of the execution control unit 150 based on the prediction result (S111). As described above, for example, the execution control unit 150 decides a setting of the process, more specifically, a process format and/or a process parameter, on the basis of results of the process using respective process formats and/or respective process parameters that have been predicted by the result prediction unit 140. Alternatively, in the case where effect obtained from the process is disproportionate to cost of the process in accordance with the result predicted by the result prediction unit 140, the execution control unit 150 may decides not to execute the process (decides to skip the process).

Additionally, for example, in the case where the database 180 is updatable, the result evaluation unit 160 may evaluate a result of the process executed by the process execution unit 152 (S113), and the database updating unit 180 may update the database 180 on the basis of a result of the evaluation and the feature amount of the data extracted in S103 (S115). By updating the database 180 on the basis of the result of the executed process as described above, it is possible to improve accuracy of the result prediction performed by the result prediction unit 140 in the case where a subsequent process is executed.

On the other hand, in the case where it is determined that the matching has been failed in S107 (NO), the process execution unit 152 executes the process on the data regardless of the feature amount of the data (without referring to the prediction result) (S117). Subsequently, the result of the executed process may be additionally evaluated in a way similar to S113 and S115, and the database 180 may be updated on the basis of the evaluated result and the feature amount in the case where the database 180 is updatable, for example. In this case, a reference feature amount corresponding to the feature amount extracted in S103 is not stored in the database 180. Therefore, the database updating unit 170 adds the extracted feature amount as a new reference feature amount to the database 180 in association with information on the result of the process evaluated in S113. This widens a range in which the feature amount matching unit 130 can finds a corresponding reference feature amount in the case of executing subsequent processes. It is possible to widen a range of data to which prediction of a result by the process result prediction unit 140 can be applied. In the case where such addition of data is possible, the database 180 that has been initially prepared does not have to have a large size that covers much of data.

Figure 3:
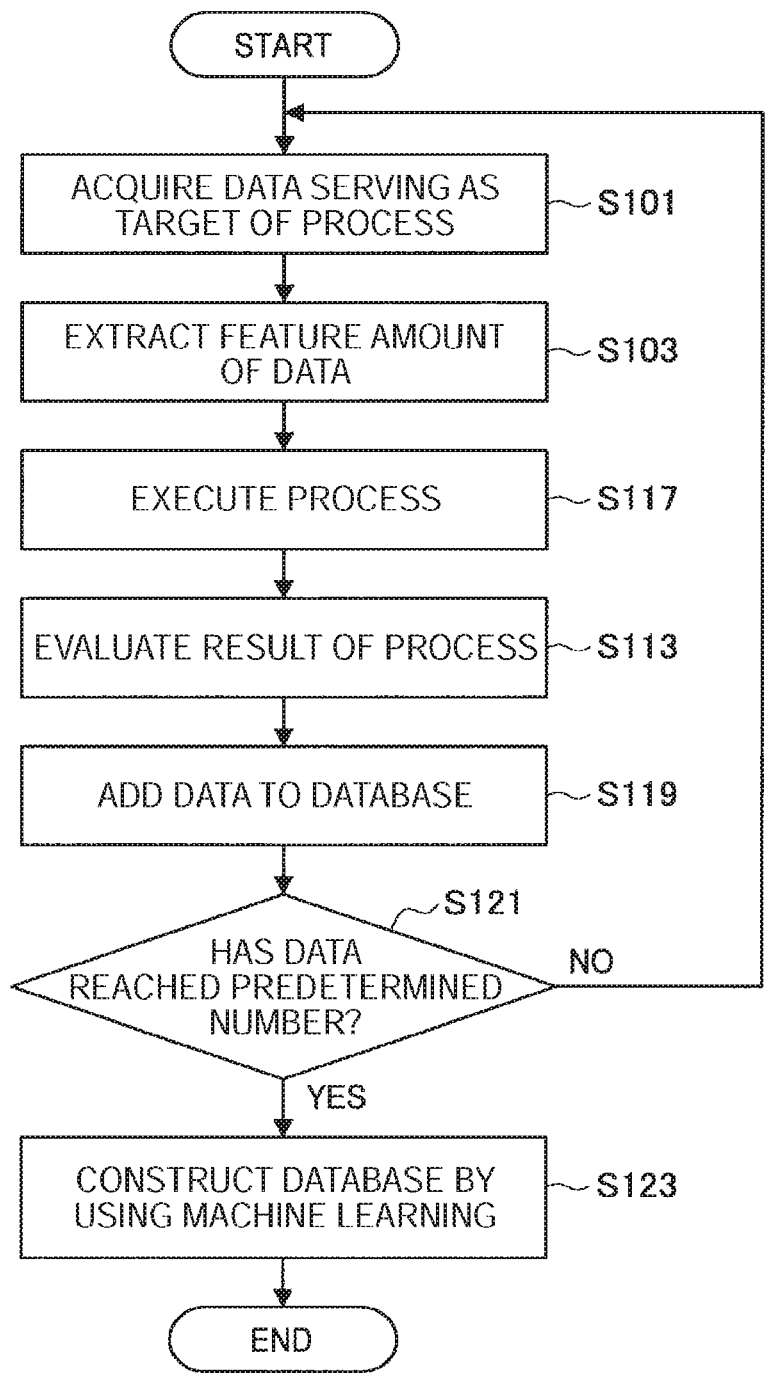
FIG. 3 is a flowchart illustrating an example of a process in the case of newly constructing a database according to an embodiment of the present disclosure.

FIG. 3 is a flowchart illustrating an example of a process in the case of newly constructing a database according to the embodiment of the present disclosure. According to the embodiment, by reading the externally created database 180 into storage of the information processing device 100, it is possible for the process result prediction unit 140 to predict effect, for example. However, it is also possible that the information processing device 100 itself creates the database 180 on the basis of a result of the process executed for the data. FIG. 3 illustrates an example of a process of the information processing device 100 in a stage of creating the database 180 alone. After a certain amount of results of the process is accumulated and prediction of a process result based on the database 180 becomes possible, it is possible to sequentially update the database 180 in parallel with prediction of a process result in a way similar to the process described above with reference to FIG. 2.

With reference to FIG. 3, the data acquisition unit 110 first acquires data serving as a target of a process (S101). Next, the feature amount extraction unit 120 extracts a feature amount of the acquired data (S103). These steps are similar to the process in FIG. 2.

Next, the process execution unit 152 executes the process on the data regardless of the feature amount of the data (without referring to the prediction result) (S117). Additionally, the result evaluation unit 160 evaluates a result of the process executed by the process execution unit 152 (S113), and the database updating unit 170 may add new data to the database 180 on the basis of a result of the evaluation and the feature amount of the data extracted in S103 (S119). When the accumulated data reaches a predetermined number (YES in S121), the database updating unit 170 executes a process of machine learning using the accumulated data as the training data, and constructs the database 180 in which reference feature amounts are associated with results of the process prediction (S123).

(3. Specific Example of Image Data)

Figure 4:
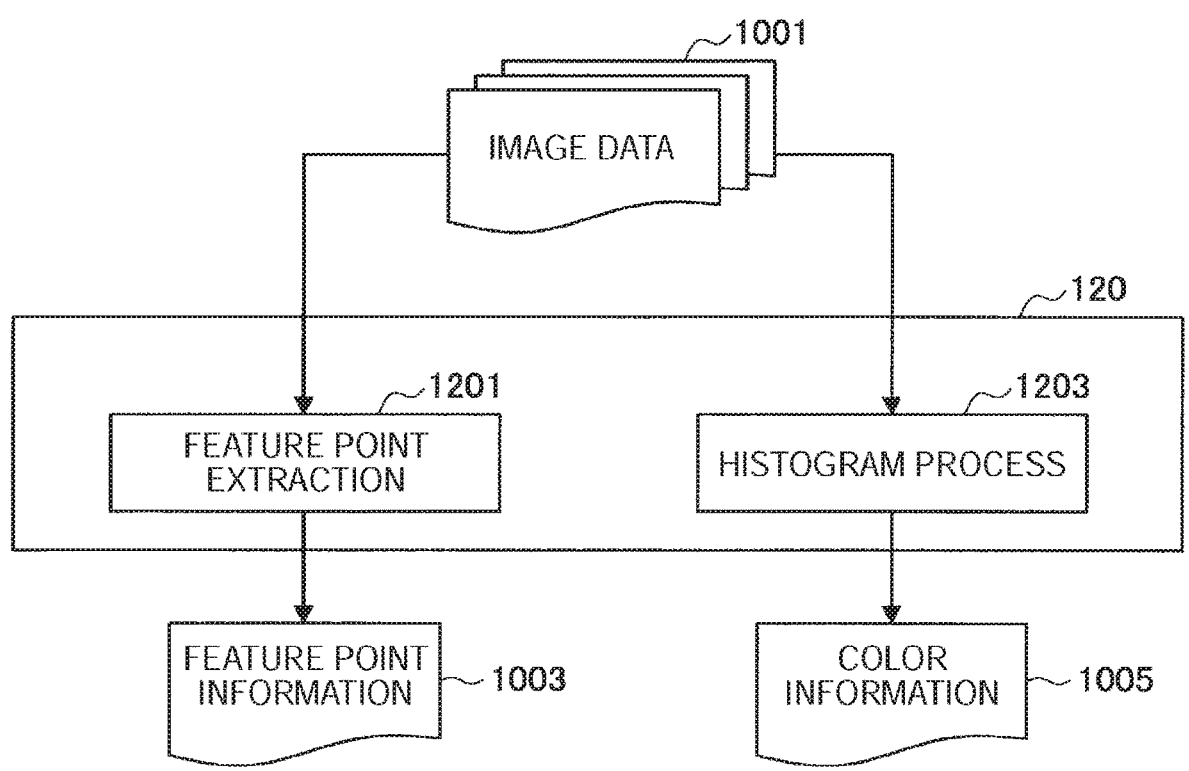
FIG. 4 is a diagram illustrating a specific example of feature amount execution from image data according to an embodiment of the present disclosure.

FIG. 4 is a diagram illustrating a specific example of feature amount execution from image data according to the embodiment of the present disclosure. In the illustrated example, a process performed on image data 1001 by the feature amount extraction unit 120 includes a feature point extraction process 1201 and a histogram process 1203. As a result, feature point information 1003 and color information 1005 are extracted as the feature amount. Here, the feature amount extraction process 1201 is executed on the basis of Speeded Up Robust Features (SURF), for example.

Figure 5:
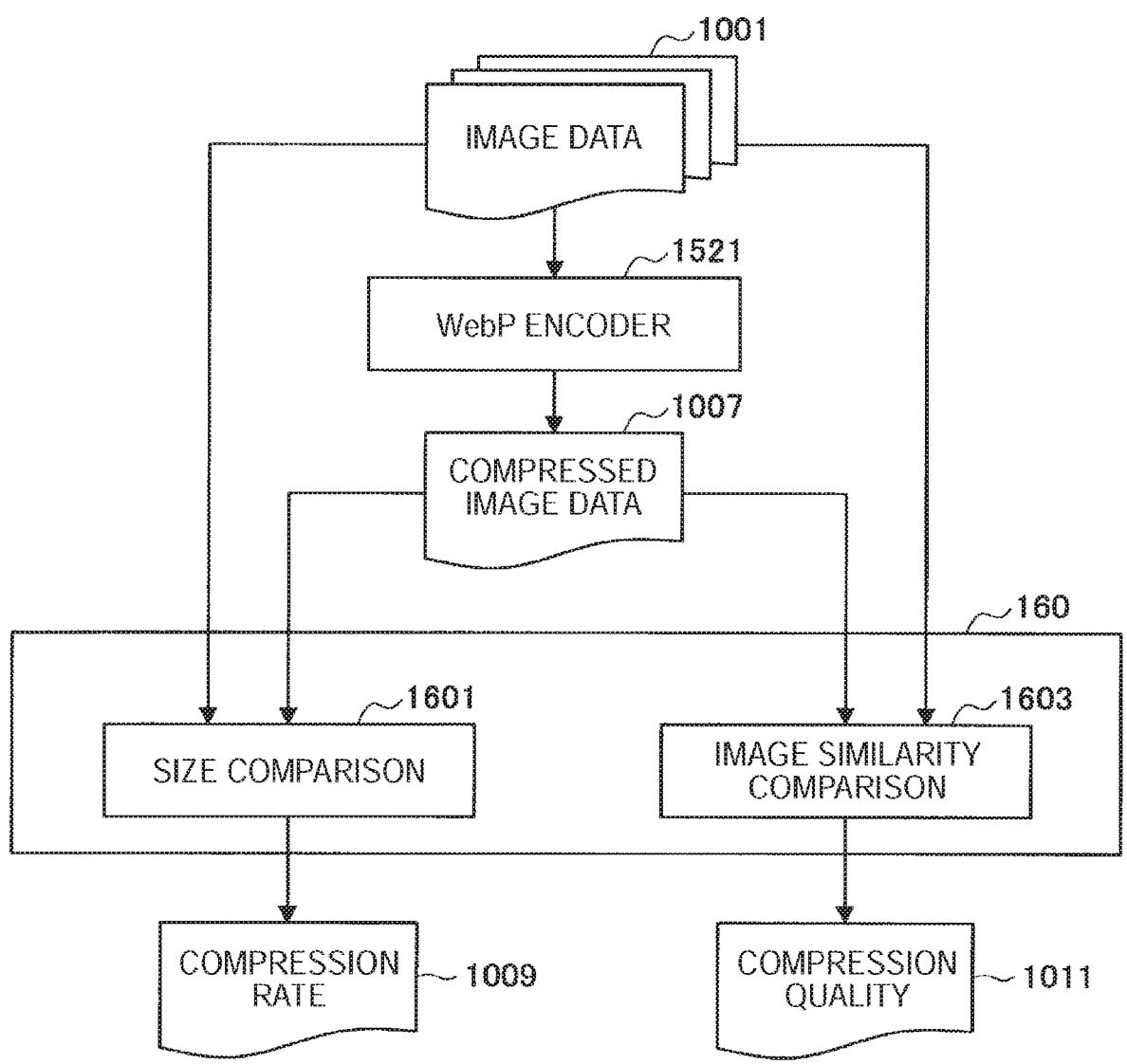
FIG. 5 is a diagram illustrating a specific example of evaluation of an image data processing result according to an embodiment of the present disclosure.

FIG. 5 is a diagram illustrating a specific example of evaluation of an image data processing result according to the embodiment of the present disclosure. In the illustrated example, a WebP encoder 1521 in the process execution unit 152 compresses the image data 1001. As a result, compressed image data 1007 is obtained. In addition, in the illustrated example, the result evaluation unit 160 evaluates a result of the process of the compressed image data 1007 by using a size comparison process 1601 and an image similarity comparison process 1603. As a result, a compression rate 1009 and compression quality 1011 are obtained as evaluation indexes of the process result. Here, the image similarity comparison process 1603 may be executed on the basis of Structural SIMilarity (SSIM), for example. The process based on the SSIM is described in "Image quality assessment: From error visibility to structural similarity", IEEE Transactions on Image Processing, vol. 13, no. 4, pp. 600-612, April 2004, for example.

Figure 6:
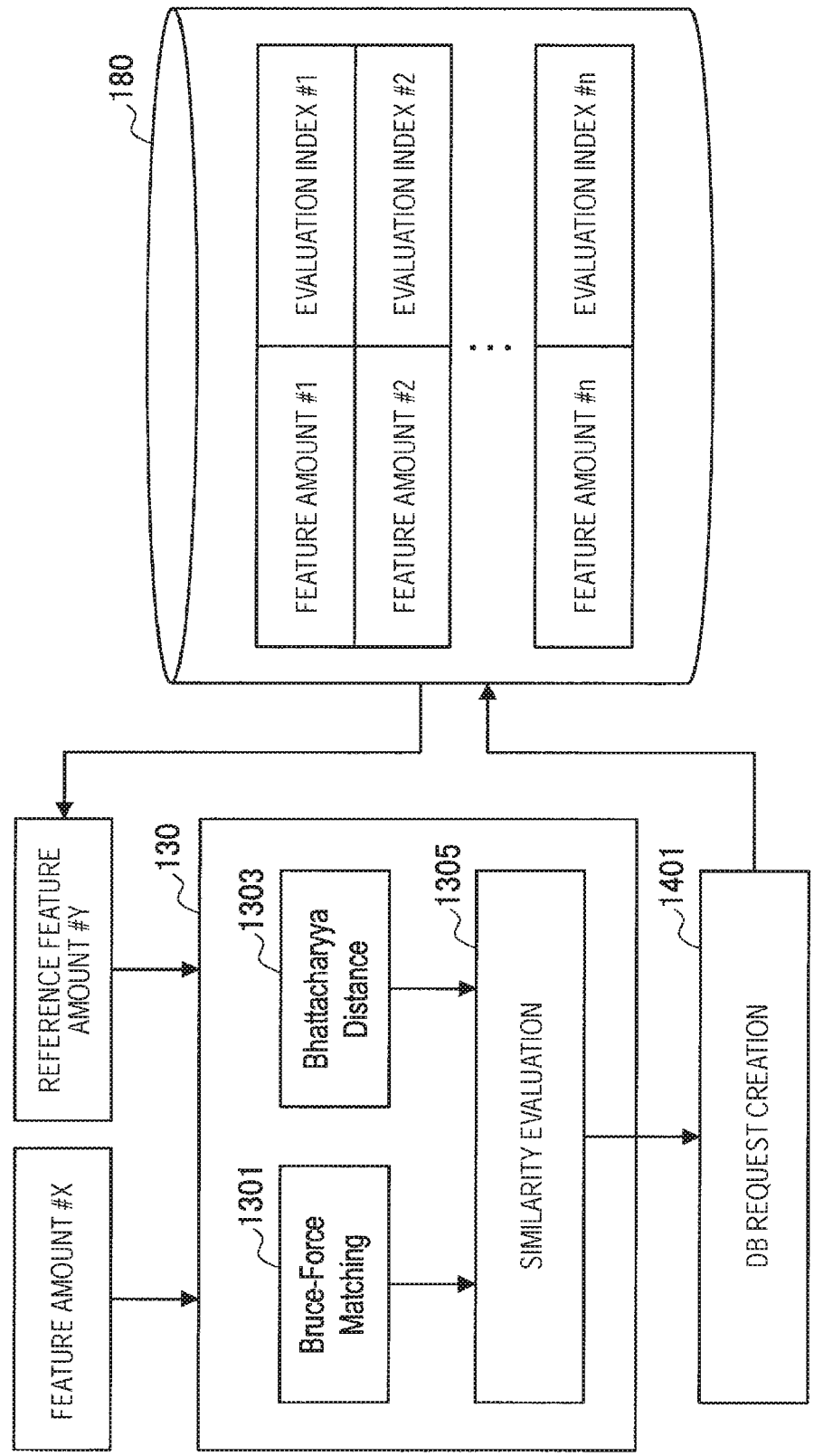
FIG. 6 is a diagram illustrating a specific example of feature amount matching of image data according to an embodiment of the present disclosure.

FIG. 6 is a diagram illustrating a specific example of feature amount matching of image data according to the embodiment of the present disclosure. In the illustrated example, matching of a feature amount # X extracted from target image data with a reference feature amount # Y associated with the evaluation index of the compression process result in the database 180 is performed. The database 180 includes data that associates a reference feature amount #1 to a reference feature amount # n with an evaluation index #1 to an evaluation index # n, respectively. The feature amounts and the reference feature amounts may correspond to the feature point information 1003 and the color information 1005 described with reference to FIG. 4, for example. In addition, the evaluation indexes may corresponds to the compression rate 1009 and the compression quality 1011 described with reference to FIG. 5, for example.

In the illustrated example, the feature amount matching unit 130 executes similarity evaluation 1305 between the feature amount # X and the reference feature amount # Y on the basis of results of bruce-force matching 1301 and a Bhattacharyya distance calculation process 1303. The bruce-force matching 1301 is an example of a method that is used for calculating distance between feature amounts in a feature space. In addition, the Bhattacharyya distance calculation process 1303 is an example of a method that is used for calculating distance of a color histogram. In the case where it is evaluated that the feature amount # X is similar to the reference feature amount # Y (matching has succeeded) in the similarity evaluation 1305, the result prediction unit 140 executes a query issuance process 1401 for acquiring information on the evaluation index # Y associated with the reference feature amount # Y from the database 180.

(4. Example of Image Data Processing Result)

A table 1 listed below illustrates relation between process parameters (parameters indicating compression methods or filter intensities) of an encoder and evaluation indexes (compression rate, PSNR, and SSIM) of compression process results in the case where a compression process using the WebP encoder is executed for two sample image. As the SSIM, the peak signal-to-noise ratio (PSNR) is an index of similarity (identity) between an image before compression and the image after the compression. FIG. 7 and FIG. 8 illustrates examples of an image after compression in the case of the parameter=80 (A) and in the case of the parameter=0 (B) with regard to the samples 1 and 2.

TABLE 1

|  | Parameter = 80 | Parameter = 40 | Parameter = 0 |
|---|---|---|---|
| SAMPLE 1 |  |  |  |
| Comp. rate | 54% | 33% | 8% |
| PSNR | 36% | 31% | 22% |
| SSIM | 95% | 90% | 68% |
| SAMPLE 2 |  |  |  |
| Comp. rate | 53% | 30% | 7% |
| PSNR | 35% | 31% | 23% |
| SSIM | 96% | 92% | 69% |

As illustrated in this example, the compression rate and the image similarity change under a trade-off situation in accordance with settings of the parameter in the image compression process. More specifically, in the case of a large parameter value, the compression rate is low and the image similarity is high. On the other hand, in the case of a small parameter value, the compression rate is high and the image similarity is low. In view of overall trend, such compression effect relation is common to any kind of image. However, how much the compression rate and the image similarity actually change varies according to content of images as illustrated in the above described examples of the samples 1 and 2. Therefore, it is useful to predict effect according to each parameter setting in advance by using the function of the result prediction unit 140, the effect including the compression rate, the image similarity, and the like.

Figure 9:
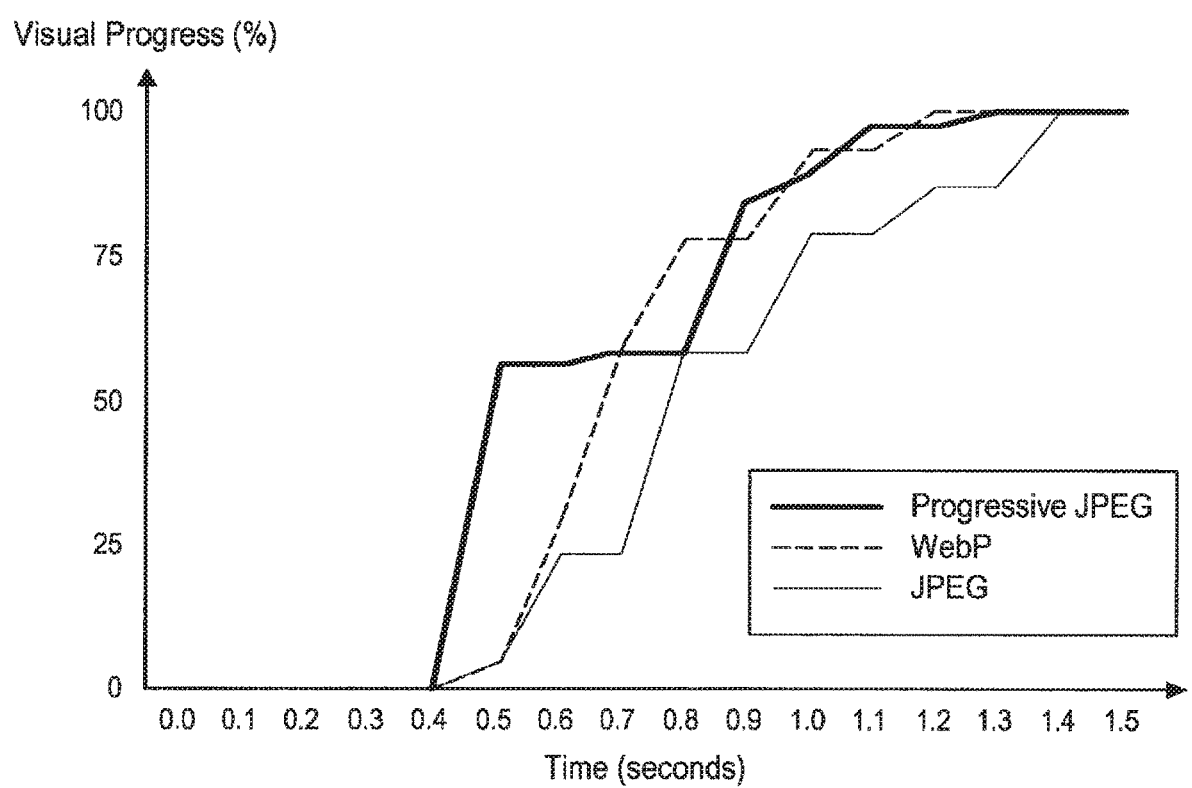
FIG. 9 is a graph illustrating an example of progress in drawing according to image data compression formats.

FIG. 9 is a graph indicating progress in drawing in the case where a certain sample image is compressed into a progressive JPEG format, a WebP format, and a JPEG format (baseline), respectively. With reference to FIG. 9, in the case of the progressive JPEG or the WebP, drawing is progressed in a shorter time than the normal JPEG. When the progressive JPEG and the WebP are compared, drawing of the progressive JPEG is progressed faster in an initial period, and drawing of the WebP is progressed faster and stably after a middle period. The drawing of the WebP finishes a little bit ahead of the progressive JPEG. According to the illustrated example, the progressive JPEG is suitable for a case where quick display of a rough image (may contain distortion or noise) is desired, and the WebP is suitable for a case where quick display of an entire image is desired.

However, progress of drawing in the respective compression formats as illustrated in FIG. 9 and process time and cost such as power consumption related to the respective compression formats may differ according to content of the image. For example, the most of images currently on the web are JPEG (baseline). However, it may be determined whether to convert such images into the progressive JPEG or the WebP, or not to convert the images and provide the images in the JPEG (baseline) without conversion, on the basis of relation between cost for conversion processes and drawing time of the respective formats. In the case of making a determination in such a way, it is useful to predict effects of the respective compression formats before actually executing the conversion by using the function of the result prediction unit 140.

A table 2 listed below indicates time required for encoding and decoding using JPEG XR and the WebP. Values with % units indicate rates of shortened time while PNG is 100% (that is, "75%" means that process time is shortened by 75% of the case of PNG). The values with "-" mean that process time is prolonged compared with the PNG.

TABLE 2

|  | JPEG XR | | WebP | |
| --- | --- | --- | --- | --- |
|  | Lossy | Lossless | Lossy | Lossless |
| Encode Time | 75% | 79% | 66%-90% | 93%-99% |
| Decode Time | −32% | −32% | 90%+ | 50%-90% |

As illustrated in the table, the WebP is generally faster than the JPEG XR. In addition, lossy compression is faster than lossless compression. Although it is not illustrated in the table, the WebP is 5 to 10 times faster than JPEG in encoding, and the WebP is 1.3 times faster than the JPEG in decoding. However, as the encode time in the case of WebP lossy compression, the compression effect varies according to content of an image, for example. Although it is not illustrated in the table, data size after compression, process time, cost for power consumption, and the like vary according to content of images in the cases of the respective compression formats and whether it is lossy compression or lossless compression. Accordingly, in the case of selecting the compression formats and the parameters (for example, lossy compression or lossless compression), it is useful to predict effect of the respective compression formats before actually executing the conversion by using the function of the result prediction unit 140.

For example, the above described embodiment of the present disclosure can be applied to image display in web browsers. In this case, for example, the information processing device 100 constitutes a proxy server. In this case, a server has to perform compression or the like on an image so that the image suits to a usage situation of a platform (hardware or operating system) equipped with a browser that displays the image at a client side. In this example, information indicating the usage situation of the platform is added to a request for a web page including the image from the client side, for example.

On the other hand, in the proxy server (information processing device 100), a feature amount of the image to be provided is extracted, and a result of an image compression process is predicted by performing matching of the extracted feature amount. The proxy server can decide a format of compression process and/or a process parameter on the basis of the predicted result of the compression process so that the compression rate, the compression quality, and the like suit to the usage situation of the platform in the client. More specifically, for example, in the case where a terminal device of the client operates in a network environment of a narrow band, it is possible to minimize delay in image display and improve user experience by selecting a process parameter and/or a process format by which a high compression rate can be acquired.

The specific example of the configuration and effect according to the embodiment of the present disclosure have been described. The embodiment of the present disclosure is not limited to the above described example. It should be understood by those skilled in the art that various modified examples may be made in the range without departing from the content of the present specification. For example, (5. Hardware Configuration)

Figure 10:
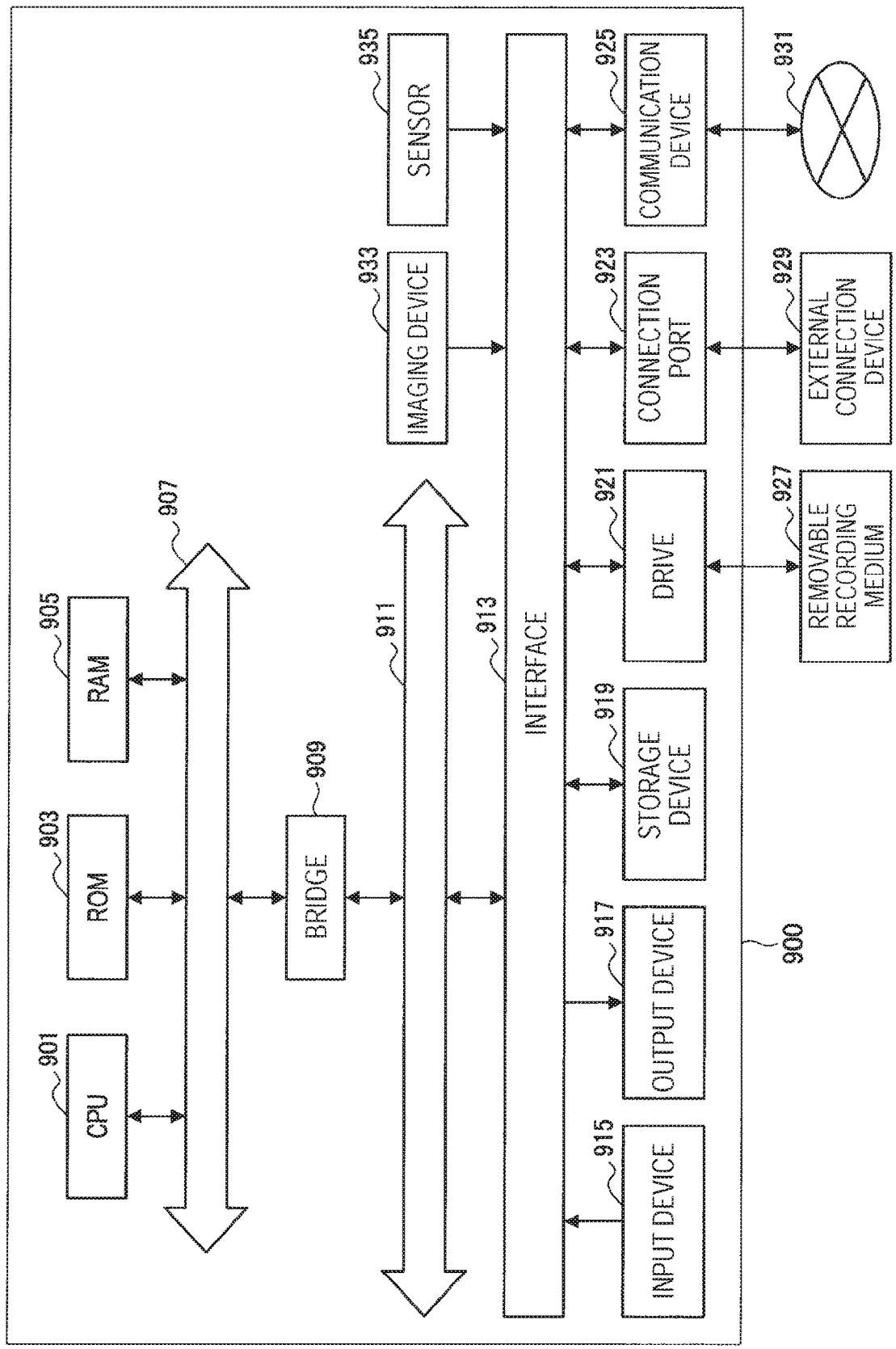
FIG. 10 is a block diagram illustrating a hardware configuration example of an information processing device according to an embodiment of the present disclosure.

Next, with reference to FIG. 10, a hardware configuration of the information processing device according to the embodiment of the present disclosure will be described. FIG. 10 is a block diagram illustrating a hardware configuration example of the information processing device according to the embodiment of the present disclosure. An illustrated information processing device 900 may correspond to the information processing device 100 according to the above described embodiments.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 including an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radiowaves. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data and indicates a processing operation to the information processing device 900 by operating the input device 915.

The output device 917 includes a device that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various types of data executed by the CPU 901, and various types of data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing device 900. The connection port 923 may include a Universal Serial Bus (USB) port, an IEEE1394 port, and a Small Computer System Interface (SCSI) port, for example. In addition, the connection port 923 may be an RS-232C port, an optical audio terminal, a High-Definition Multimedia Interface (HDMI) (registered trademark) port, and so on. The connection of the external connection device 929 to the connection port 923 makes it possible to exchange various types of data between the information processing device 900 and the external connection device 929.

The communication device 925 is a communication interface including, for example, a communication device for connection to a communication network 931. The communication device 925 may be, for example, a communication card for a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is a device that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a global positioning system (GPS) receiver that receives GPS signals to measure latitude, longitude, and altitude of the device.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiment of the present disclosure may include, for example, the above-described information processing device, a system including one or more information processing devices, an information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

a feature amount extraction unit configured to extract a feature amount of data serving as a target of a process;

a feature amount matching unit configured to match the feature amount with one or more reference feature amounts associated with a prediction result of the process in a database; and a result prediction unit configured to predict a result obtained in a case where the process is executed for the data, on the basis of a result of the matching.

(2)

The information processing device according to (1), further including:

an execution control unit configured to control execution of the process on the basis of the prediction result.

(3)

The information processing device according to (2), wherein the execution processing unit decides a setting of the process on the basis of the prediction result.

(4)

The information processing device according to (3), wherein the setting includes a format of the process or a parameter of the process.

(5)

The information processing device according to any one of (2) to (4), wherein the execution control unit decides whether or not to execute the process on the basis of the prediction result.

(6)

The information processing device according to any one of (2) to (5), further including:

a result evaluation unit configured to evaluate a result of the execution; and a database updating unit configured to update the database on the basis of the feature amount and a result of the evaluation.

(7)

The information processing device according to (6), wherein the database updating unit adds data indicating that the feature amount is treated as a reference feature amount to the database in a case where the matching has been failed.

(8)

The information processing device according to any one of (1) to (7),
wherein the result prediction unit predicts a compression rate for compressing the data, quality of the data after compression, and identity between the data before compression and the data after compression.

(9)

The information processing device according to any one of (1) to (8),
wherein the result prediction unit predicts cipher strength for encrypting the data.

(10)

The information processing device according to any one of (1) to (9),
wherein the result prediction unit predicts process time or an amount of resource consumption for executing the process on the data.

(11)

The information processing device according to any one of (1) to (10), wherein
the data includes data for displaying an image, and
the feature amount extraction unit extracts a feature amount that is independent of resolution and rotation of the image.

(12)

An information processing method including:
extracting a feature amount of data serving as a target of a process;
matching, by a processor, the feature amount with one or more reference feature amounts associated with a prediction result of the process in a database; and
predicting a result obtained in a case where the process is executed for the data, on the basis of a result of the matching.

REFERENCE SIGNS LIST 100 information processing device
110 data acquisition unit
120 feature amount extraction unit
130 feature amount matching unit
140 result prediction unit
150 execution control unit
160 result evaluation unit
170 database updating unit
180 database

The invention claimed is:

1. An information processing device comprising:
processing circuitry configured to
receive image data from an image sensor,
extract a feature amount of the image data,
match the feature amount of the image data with one or more reference feature amounts in a database based on a calculated distance between the extracted feature amount and the one or more reference feature amounts, wherein the database is constructed by using machine learning, and
in response to a matching result,
predict a result of a process for the image data, and
determine the process to be executed based on the predicted result.

2. The information processing device according to claim 1, wherein the processing circuitry is further configured to determine a setting of the process to be executed.

3. The information processing device according to claim 1, wherein the setting includes a format of the process or a parameter of the process.

4. The information processing device according to claim 1, wherein the processing circuitry is further configured to determine whether or not to execute the process.

5. The information processing device according to claim 1, wherein the predicted result is quantitative information or qualitative information.

6. The information processing device according to claim 1, wherein the predicted result is information indicating that the process is not suitable for the extracted feature amount.

7. The information processing device according to claim 1, wherein the processing circuitry is further configured to update the database based on the matching result.

8. The information processing device according to claim 7, wherein the processing circuitry is further configured to update the database on the basis of a relation between the extracted the feature amount and the one or more reference feature amounts.

9. The information processing device according to claim 1, wherein the processing circuitry is further configured to update, if the matching result is a failure, the database by registering the extracted feature amount as a new reference feature amount.

10. The information processing device according to claim 1, wherein the processing circuitry is further configured to execute the determined process regardless of the extracted feature amount if the matching result is a failure.

11. A method comprising:
receiving image data from an image sensor;
extracting a feature amount of the image data;
matching the feature amount of the image data with one or more reference feature amounts in a database based on a calculated distance between the extracted feature amount and the one or more reference feature amounts, wherein the database is constructed by using machine learning; and
in response to a matching result,
predict a result of a process for the image data, and
determine the process to be executed based on the predicted result.

12. A non-transitory computer-readable storage medium storing executable instructions, which when executed by processing circuitry cause the processing circuitry to execute a method, the method comprising:
receiving image data from an image sensor;
extracting a feature amount of the image data;
matching the feature amount of the image data with one or more reference feature amounts in a database based on a calculated distance between the extracted feature amount and the one or more reference feature amounts, wherein the database is constructed by using machine learning; and
in response to a matching result,
predict a result of a process for the image data, and
determine the process to be executed based on the predicted result.

13. The non-transitory computer-readable storage medium of claim 12, wherein the method further comprises:
determining a setting of the process to be executed.

14. The non-transitory computer-readable storage medium of claim 12, wherein the setting includes a format of the process or a parameter of the process.

15. The non-transitory computer-readable storage medium of claim 12, wherein the method further comprises:
determining whether or not to execute the process.

16. The non-transitory computer-readable storage medium of claim 12, wherein the predicted result is quantitative information or qualitative information.

17. The non-transitory computer-readable storage medium of claim 12, wherein the predicted result is information indicating that the process is not suitable for the extracted feature amount.

18. The non-transitory computer-readable storage medium of claim 12, wherein the method further comprises:
updating the database based on the matching result.

19. The non-transitory computer-readable storage medium of claim 18, wherein the method further comprises:
updating the database on the basis of a relation between the extracted the feature amount and the one or more reference feature amounts.

20. The non-transitory computer-readable storage medium of claim 12, wherein the method further comprises:
updating, if the matching result is a failure, the database by registering the extracted feature amount as a new reference feature amount.

21. The non-transitory computer-readable storage medium of claim 12, wherein the method further comprises:
executing the determined process regardless of the extracted feature amount if the matching result is a failure.

\* \* \* \* \*